United States Patent [19]

Woodworth

[11] Patent Number: 4,898,224
[45] Date of Patent: Feb. 6, 1990

[54] REAR WINDOW SHADE ASSEMBLY

[76] Inventor: Wesley L. Woodworth, 548 Wateroak Rd., Virginia Beach, Va. 23452

[21] Appl. No.: 314,521

[22] Filed: Feb. 23, 1989

[51] Int. Cl.$^4$ ............................................. E06B 9/20
[52] U.S. Cl. .................................... 160/310; 160/265; 160/370.2; 296/97.8
[58] Field of Search .............. 160/310, 265, 370.2; 296/97.4, 97.8, 97.9, 97.1

[56] References Cited

U.S. PATENT DOCUMENTS

| | | | |
|---|---|---|---|
| 1,529,280 | 3/1925 | Sutter | 160/265 X |
| 1,973,382 | 9/1934 | Merkl | 156/28 |
| 2,086,092 | 7/1937 | Pilon | 156/28 |
| 2,690,928 | 10/1954 | Boynes | 296/95 |
| 4,390,054 | 6/1983 | Niibori et al. | 160/265 |
| 4,758,041 | 7/1988 | Labeur | 296/97 |

Primary Examiner—Blair M. Johnson
Attorney, Agent, or Firm—Griffin, Branigan & Butler

[57] ABSTRACT

A rear window shade assembly (10) comprises a base (18) which can be set on a back-seat shelf (12) of an automobile with a roll shade mechanism (38), a winch (44), and an angularly adjustable crane arm (70) mounted thereon. A cord (60) extending from the winch along the crane arm is attached to an outer end of a shade (42) on the roll-shade mechanism for deploying and retracting the shade. The crane arm is constructed of a flexible tube so that its position is automatically angularly adjustable relative to the base.

9 Claims, 1 Drawing Sheet

REAR WINDOW SHADE ASSEMBLY

BACKGROUND OF THE INVENTION

This invention relates generally to the art of automobile window shades, and more specifically to a shade for a rear window of an automobile.

A number of rear-window shade mechanisms have been suggested for automobiles, however, many of them are somewhat impractical. In this regard, it is often necessary to mount such mechanisms in automobiles after automobile bodies are built and in service, because many people do not wish to pay extra costs associated with such rear-window shades. Thus, it is an object of this invention to provide a rear-window shade assembly which is portable in nature and which can be easily mounted in automobiles after they have been fully constructed. Similarly, it is an object of this invention to provide such a rear-window shade assembly which can be moved from one automobile to another automobile.

Still another difficulty with many prior-art rear-window shade assemblies is that they require specially manufactured parts and mechanisms, which makes them expensive and impractical. Thus, it is an object of this invention to provide a rear-window shade assembly which is constructed primarily of off-the-shelf parts which can be easily molded and formed to produce a rear window shade assembly.

Still another difficulty with many prior art rear-window shade assemblies is that they can be used in some cars, but are not practical for use in other cars. Therefore, it is an object of this invention to provide a portable rear window shade assembly which can be used in many different cars of different sizes and shapes.

SUMMARY

According to principles of this invention, a rear-window shade assembly comprises a base on which is mounted a motor driven winch and an angularly-adjustable crane arm extending upwardly from the base. A roll shade mechanism is also mounted on the base including a cylindrical drum which is spring biased to retract a shade which is wrapped thereabout and deployed therefrom. A cord extends from a spool of the winch about an outer end of the crane arm and is attached to an outer end of the shade. The winch is power driven to deploy the shade and to allow a spring of the shade mechanism to retract the shade. The crane arm, in the preferred embodiment, is constructed of a flexible tube with the cord extending through the tube. The flexibility of the crane arm allows the crane arm to bend, or flex, to fit most automobiles.

BRIEF DESCRIPTION OF THE DRAWING

The foregoing and other objects, features and advantages of the invention will be apparent from the following more particular description of a preferred embodiment of the invention, as illustrated in the accompanying drawing in which reference characters refer to the same parts throughout the different views. The drawing is not necessarily to scale, emphasis instead being placed upon illustrating principles of the invention in a clear manner.

DESCRIPTION OF THE PREFERRED EMBODIMENT

Figure 1:
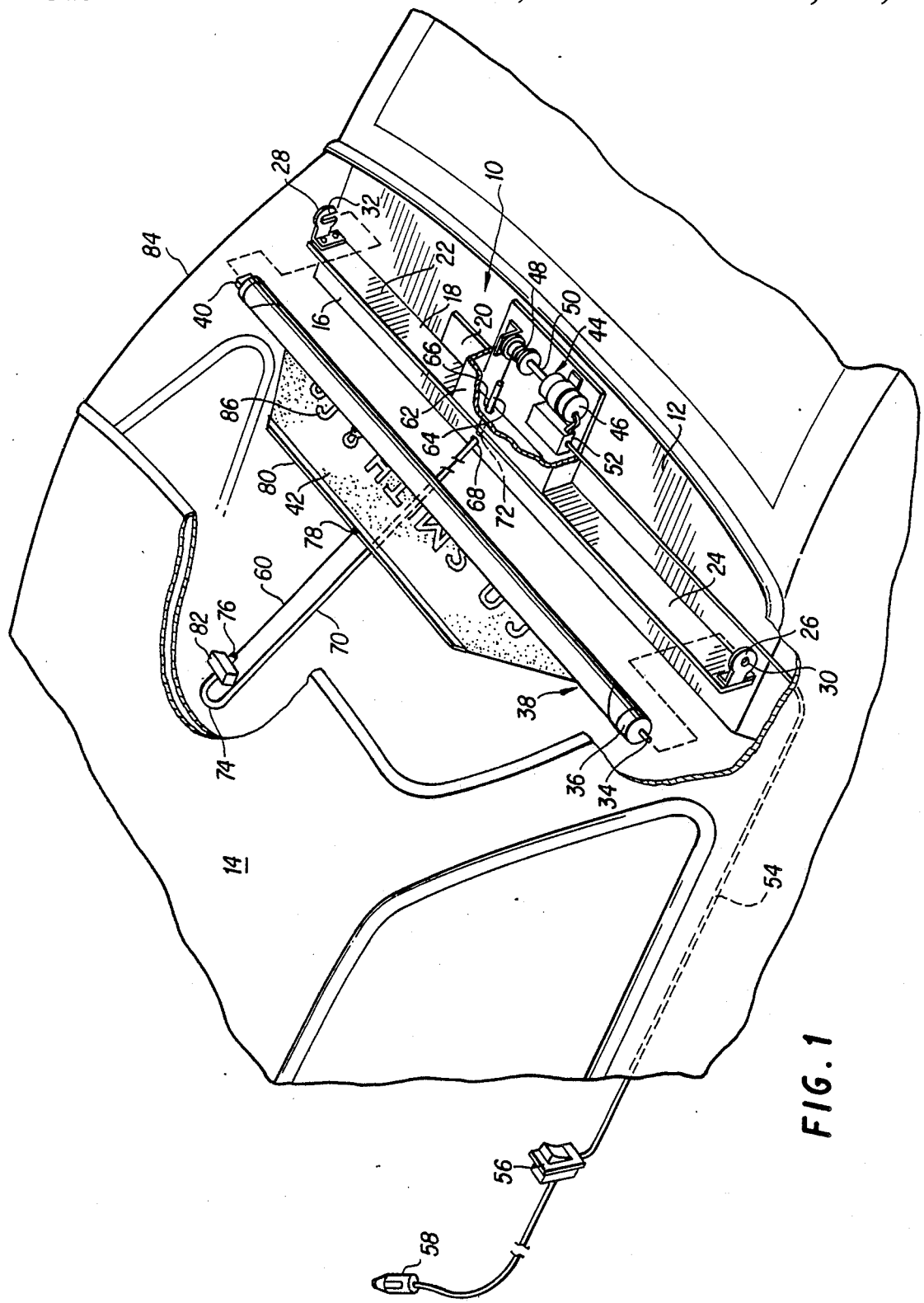
FIG. 1 is an isometric, partially cutaway, partially exploded, view of a window shade assembly of this invention through the rear window of an automobile.

Referring now to the drawing, a rear-window shade assembly 10 is mounted on a back seat shelf 12 of an automobile 14. As in most automobiles, the back-seat shelf 12 is located behind a back rest 15 of a rear, or back, seat 16 of the automobile 14. The rear-window shade assembly 10 comprises a base 18 including a horizontal member 20 and a vertical member 22. Basically, the horizontal member 20 is a flat board having parallel flat upper and lower surfaces while the vertical member 22 is also a flat board supported on a side edge surface from the upper surface of the horizontal member 20. The vertical member 22 has mounted on its side surface 24, facing the rear of the automobile 14, first and second shade brackets 26 and 28. These shade brackets are of a normal type used for house shades, with the first shade bracket 26 having a round hole 30 therein and the second shade bracket 28 having an oblong slot 32 therein. The round hole 30 receives a round support protrusion 34 of a first end of a cylindrical drum 36 of a roll shade mechanism 38 while the oblong slot 32 receives a rectangularly shaped protrusion 40 at a second end of the cylindrical drum 36. The rectangularly shaped protrusion 40 is coupled to the cylindrical drum 36 via a spring which is biased to rotate the cylindrical drum 36 so as to roll up, or retract, a shade 42, mounted thereon. The oblong slot 32 prevents the rectangularly shaped protrusion 40 from rotating therein.

A winch 44 is mounted on the upper surface of the horizontal member 20. The winch 44 comprises a rotating motor 46, which is of a type currently used for power screwdrivers, and a spool 48 coupled to the motor 46 by means of a drive shaft 50. Circuitry, including limit switches, resistors, and the like, indicated at 52, are electrically coupled to the motor 46. The motor 46 is driven by 12 V power obtained via a power line 54, a control switch 56 and a cigarettes lighter plug 58. The spool 48 winds and unwinds a cord 60. The winch 44 and its circuitry 52 are enclosed within a motor box 62, (shown cutaway for illustrative purposes) while the cord 60 extends via a guide tube 64 to a hole 66 in the vertical member 22. A hole 68 in the opposite side of the vertical member 22 receives a crane-arm tube 70 whose lower end, when inserted into the hole 68, is aligned with an upper end of the base guide tube 64 and these two members meet at 72. The crane-arm tube 70 is supported at its lower end by walls of the hole 68 of the vertical member 22 and extends on an angle upwardly to an upper end portion 74 which is bent approximately 180° so that its outer end 76 faces downwardly toward the roll-shade mechanism 38. The cord 60 extends through the base guide tube 64, and the crane-arm tube 70 and its outer end 78 is attached to an outer end 80 of the shade 42. In this regard, the outer end 80 of the shade 42 is reenforced by means of a rigid spar (not shown). A support rest 82 is attached to the upper end portion 74 of the crane-arm tube 70 so as to face a rear window 84 of the automobile 14.

Both the base guide tube 64 and the crane-arm tube 70 are constructed of flexible brass tubing which can be bent to determine a desired path for the cord 60. Should the angle of the a rear window 84 be particularly great, the support rest 82 will come in contact with the window, or the interior of a vehicle above the window, thereby causing the crane-arm tube 70 to bend into the vehicle as is depicted in the drawing.

In operation, the rear window shade assembly of this invention is constructed of off-the-shelf parts including a normal household shade and brackets therefor as well as brass tubing and an electric screwdriver motor. As is well known, cylindrical drums 36 of normal household shades can be cut to fit particular windows and the shades 42 thereof can have their side edges cut on an angle as shown in the drawing to fit the shape of automobile rear windows. Further, because the first and second shade brackets 26 and 28 are easy to mount and dismount it is an easy job to dismount these brackets, cut off ends of the horizontal and vertical members 20 and 22 of the base 18 so as to easily rework a rear-window shade assembly 10 to fit most automobiles. A rachet pawl (not shown) found on most household shade drums must be removed so that the drum 36 does not lock in a single position.

Once the base 28, and the roll-shade mechanism 38 are cut to proper shapes and sizes, the base 18, with the members mounted thereon shown in the drawing, is placed on a back-seat shelf 12 with the upper end 74 of the crane-arm tube 70 being further inside the vehicle then the roll-shade mechanism 38. Again, it should be understood that a lower end of the crane-arm tube 70 could be cut off should this be necessary to adapt the rear-window shade assembly 10 for a particular automobile. However, as was previously stated, the crane-arm tube 70 is flexible and can flex inwardly in order to fit variously shaped automobiles, while allowing a bottom surface of the horizontal member 20 to be flatly positioned on the back-seat shelf 12.

Once the rear-window shade assembly 10 is in position on the back-seat shelf 12, the power line 54 is positioned so that the cigarette-light plug 58 can be plugged into the cigarette lighter slot of the automobile. It should be understood that the power line 54 could also be attached directly into a 12 volt power network of an automobile at another location than a cigarette lighter receptacle.

In any event, once the rear-window shade assembly is in position, and power has been applied thereto, it can be easily raised and lowered by use of the control switch 56 which drives the motor 46 to rotate the spool 48. Longitudinal movement of the outer end 78 of the cord 60 toward and away from the cylindrical drum 36 in conjunction with the spring (not shown) in the drum, causes the drum to turn, thereby deploying and retracting, the shade 42.

As is shown in the drawing, this invention works extremely well for businesses which desire to employ a sign 86 imprinted on the shade 42 when an automobile 14 is at rest. Also, the shade assembly of this invention is easily mounted in most automobiles to allow an operator thereof to selectively protect an interior of an automobile from sun rays. Still further, the rear-window shade assembly of this invention is easy to construct, with most parts thereof being constructed of off-the-shelf items.

While the invention has been particularly shown and described with reference to a preferred embodiment, it will be understood by those skilled in the art that various changes in form and detail can be made therein without departing from the spirit and scope of the invention. For example, the crane arm 70 could be mounted on a hinge so that its angular position is adjusted by rotating it about the hinge rather than by causing it to flex as described herein. Also, it would be possible to use a back seat shelf as the horizontal base member on which a vertical base member is mounted. Further, it would be possible to place working and electronic elements of the rear-window shade assembly under the back seat shelf. Thus, the system of this invention could be mounted on an automobile at the time of its manufacture.

Embodiments of the invention in which an exclusive property or privilege are claimed are defined as follows:

1. A rear-window shade assembly for an automobile comprising:
   a roll shade mechanism including a cylindrical drum with a thin shade wrapped thereabout, said drum having first and second support protrusions at opposite ends thereof, one of said support protrusions including a biasing means for returning said drum to a rolled up position when it is rotated away from the rolled-up position;
   a base having a length at least as long as said drum of said roll shade, said base including first and second shade brackets spaced from one another approximately the length of the drum, said first and second shade bracket being respectively engagable with said first and second support protrusions, said base having a relatively flat bottom and being shaped to be positioned at an elongated shelf behind a back seat of an automobile with the drum of said shade being aligned with said shelf;
   a crane arm extending upwardly from and being supported by, said base beside said shade mechanism, said crane arm including a guide means for guiding a cord extending from said base about an upper end portion of said crane arm back down to an outer end of said shade mounted on said shade drum while allowing said cord to move longitudinally, said crane arm including a means for allowing angular adjustment of the outer end thereof relative to said base so that said shade assembly can be mounted in a variety of car shops;
   a winch mounted on said base, said winch including a motor and a spool rotated by said motor, said spool having a cord wrapped thereabout, an outer end of said cord extending along said crane arm about its outer end portion and extending back to, and being attached to, said outer end of said shade;
   whereby, said motor assembly can be mounted in most cars and said motor can be driven to deploy and to retract said shade.

2. A rear window shade assembly as in claim 1 wherein, said angular adjustment means is the resilient material of which the crane arm is made thereby allowing the crane arm to bend when its outer end contacts an inner surface of the automobile.

3. A rear window shade assembly as in claim 2, wherein, said crane arm has a tubular shape and said cord passes through a bore of the tube.

4. A rear window shade assembly as in claim 3 wherein, said drum and shade are of the typed used for normal house shades.

5. A rear window shade assembly as in claim 2, wherein said base is separate from said car and only rests on top of said elongated shelf behind said back seat.

6. A rear window shade assembly as in claim 5, wherein, said crane arm has a tubular shape and said cord passes through a bore of the tube.

7. A rear window shade assembly as in claim 1, wherein said base is separate from said car and only rests on top of said elongated shelf behind said back seat.

8. A rear window shade assembly as in claim 1, wherein, said crane arm has a tubular shape and said cord passes through a bore of the tube.

9. A rear-window shade assembly for an automobile comprising:
- a roll shade mechanism including a cylindrical drum with a thin shade wrapped thereabout, said drum having first and second support protrusions at opposite ends thereof, one of the said support protrusions including a biasing means for returning said drum to a rolled up position when it is rotated away from the rolled-up position;
- a base having a length at least as long as said drum of said roll shade, said base including first and second shade brackets spaced from one another approximately the length of the drum, said first and second shade brackets being respectively engagable with said first and second support protrusions, said base having a relatively flat bottom and being shaped to be positioned at an elongated shelf behind a back seat of an automobile with the drum of said shade being aligned with said shelf;
- a crane arm extending upwardly from and being supported by, said base beside said shade mechanism, said crane arm guiding a cord extending from said base about an upper end portion of said crane arm back down to an outer end of said shade mounted on said shade drum while allowing said cord to move longitudinally, said crane arm having a tubular shape to define a bore extending along its length;
- a winch mounted on said base, said winch including a motor and a spool rotated by said motor, said spool having a cord wrapped thereabout, an outer end of said cord extending through said bore of said crane arm about its outer end portion and extending back to and being attached to, said outer end of said shade;
- whereby, said motor assembly can be mounted in most cars and said motor can be driven to deploy and to retract said shade.

* * * * *